United States Patent Office 3,006,235
Patented Oct. 31, 1961

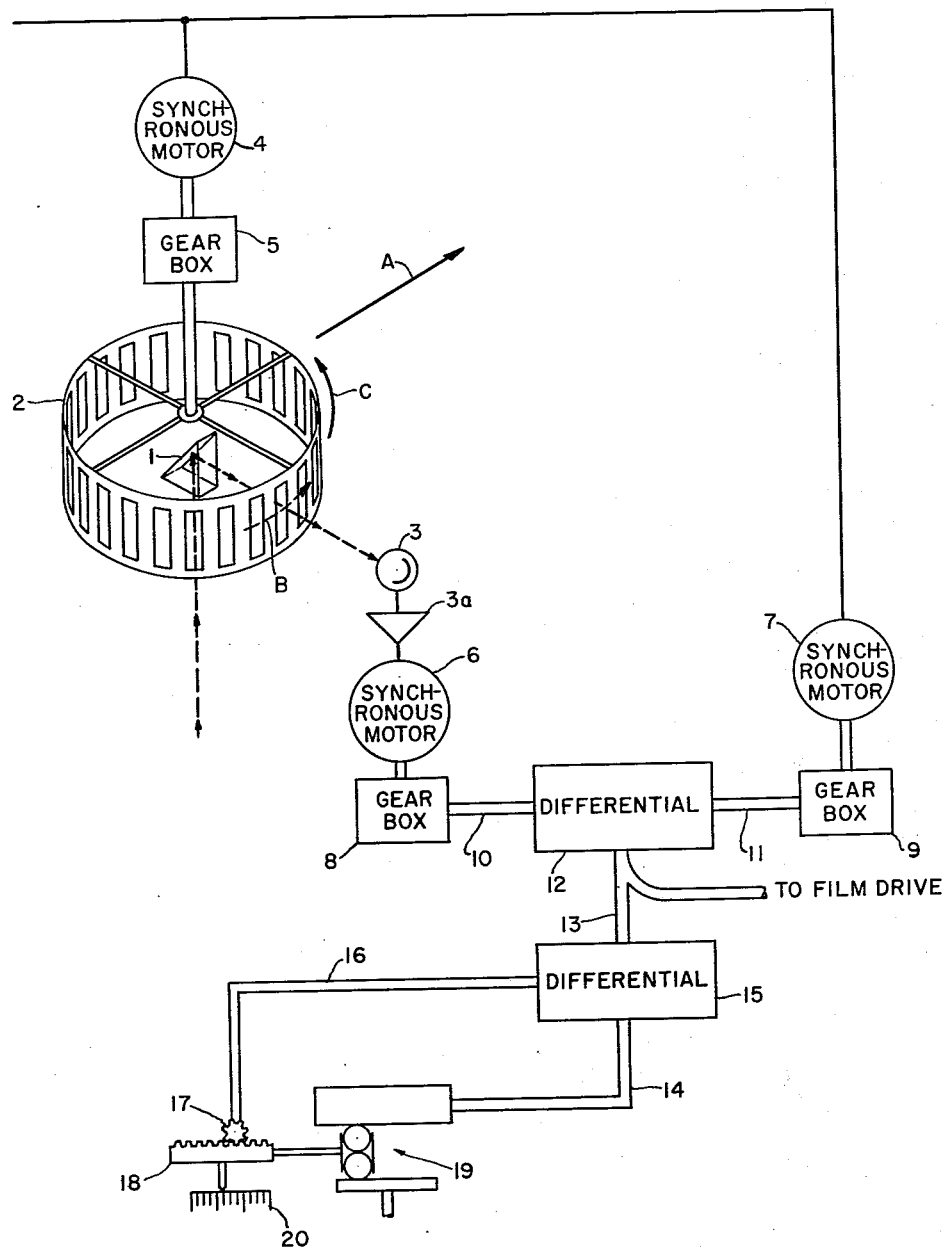

3,006,235
VELOCITY MEASURING SCANNER
FOR AIRCRAFT
Chester Brandon, Guaynabo, Puerto Rico, assignor to General Precision, Inc., a corporation of Delaware
Filed July 13, 1959, Ser. No. 826,883
2 Claims. (Cl. 88—1)

This invention relates to geometrical instruments and more particularly to instrumentalities designed to determine the ratio of ground speed to altitude in aircraft.

This application is a continuation in part of application Serial Number 564,222, filed February 8, 1956 by Chester Brandon entitled "Velocity Measuring Scanner For Aircraft," now abandoned.

Such instrumentalities are adapted for use in aerial navigation, for example in determining drift and/or true ground course, and are also useful in aerial photography for determining the rate of movement of a focused image across a focal plane and controlling film movement so as to avoid blurring of images recorded thereon.

While the invention is useful in a variety of applications of which those noted above are examples, it will be described in its preferred embodiment for application to aerial photography.

A camera commonly used in aerial photography is of the type which has no shutter, and in which a continuously moving strip of film is exposed by traversing a narrow transverse slit near the focal plane of the camera lens system. The speed at which the image of the terrain traverses the slit is the speed at which the film must be moved if an unblurred image is to be maintained on the film. The ratio, $V/H$ of airplane ground speed to airplane height above ground is a quantity which is proportional to the terrain image speed, and which has been used to control the speed of film movement.

One method which has commonly been employed to determine the desired ratio uses a grating or plate having alternate opaque and tranparent or translucent bands transverse to the direction of flight. The terrain image, passing through the grating, impinges upon a light sensitive device, such as a photocell. The image, traversing the opaque and transparent sections of the grating, periodically increases and decreases the illumination on the photocell. The output of the photocell will thus be an alternating current whose frequency is proportional to the image speed or to the ratio of ground speed to height above ground. Other radiation than light, such as infra-red or ultra-violet, can be used with a suitable radiation detector in place of the photocell.

A serious difficulty encountered in the use of the technique described above has been the electrical and electronic problems involved in connection with the low amplitude and extremely low frequency of the electrical signals frequently encountered. When the airplane flies at high altitudes, the ratio of ground speed to height above ground becomes very small, and, as a result, frequencies as low as 0.3 cycles per second must be transmitted and amplified.

Briefly described, this invention provides means for accurately determining relative ground terrain velocity, or ratio of aircraft velocity to height, $V/H$, by projecting an optically focused small area of terrain image through a grating, or grid, into a photosensitive element. The grid, when rotated, will cause the low frequency optical oscillations generated by the relative passing of ground terrain to be mixed, or heterodyned (the combining of an original frequency with an internally generated frequency to produce a sum or difference frequency), with the high frequency oscillations generated by the rotating grid. This new high frequency optical oscillation is then detected by a photocell or the like, converted to electrical energy which is easily amplified by well known A.C. amplifying techniques, and applied to a synchronous motor to develop mechanical rotation proportional to the high optical frequency detected by the photocell. This mechanical rotation is then subtracted through a mechanical differential from another mechanical rotation that is proportional to the basic unmixed optical frequency that would be generated only by the rotating grid. The differential output is then directly proportional to the relative ground terrain speed, $V/H$ and may be used to operate a camera film drive mechanism.

The primary object of this invention is then the improvement of devices for the measurement of the ratio of airplane ground speed to airplane height above ground.

Another important object of this invention is that by use of the principles of mixing or heterodyning the low unknown frequency with a known high frequency to obtain a high unknown frequency, standard and well known A.C. amplifying techniques may be used to obtain a signal with required characteristics.

Other objects will appear from the following description, reference being made to the accompanying drawings, in which:

FIGURE 1 is a block diagram of the entire apparatus, showing the electrical, mechanical and optical circuits, and in which mechanical connections are shown as double lines, electrical connections as solid lines, and optical paths as dotted lines.

The system to be described contains the following elements as shown in FIGURE 1. The image of a small area of the terrain below the airplane focused and reversed in direction by means not shown, is passed through a prism 1, and focused upon a rotary squirrel cage grid 2. The image passing through the squirrel cage grid 2 is projected on a photocell 3 which is preferably adjacent said squirrel cage grid 2 and which is responsive to the total illumination impinging upon its surface, having as its output, an electrical signal proportional to said total illumination. The grid 2, which preferably has equal alternate slit and opaque segment lengths, is driven by a synchronous motor 4 through a system of gears 5. The electrical output of the photocell is amplified and filtered in an amplifier 3a, and is fed into the synchronous motor 6. The same supply frequency which drives the squirrel cage 2 is used to drive the synchronous motor 7. The mechanical rotations of synchronous motors 6 and 7 drive, through gear boxes 8 and 9, the input shafts 10 and 11 of differential 12. The directions of rotation of the input shafts 10 and 11 are chosen so that the output 13 of the differential 12 is proportional to the difference between the outputs of synchronous motors 6 and 7.

From FIGURE 1 we can see that if the focal plane motion is zero (no image velocity), the output electrical frequency from the photocell will be directly proportional to the supply frequency. Also, motion in the direction of flight A is seen to lower the frequency of the photocell output by an amount proportional to the image velocity or to the ratio of ground speed to height above ground, assuming direction of image motion B and direction of grid rotation C. We have effectively superimposed, or heterodyned a constant frequency with the frequency which arose due to the motion of the terrain image and the new higher frequency is now easily amplified and filtered by standard and well known amplifying techniques. The differential 12 then subtracts out shaft rotation proportional to the superimposed frequency, having as its output 13 only the component due to the motion of the terrain image.

Shaft 13, the output shaft of differential 12, rotates with an angular speed proportional to the ratio of ground speed to height above ground. This output can be used to drive the film transport mechanism of an aerial camera.

The combination of a differential 15, a mechanical integrator 19, a rack 18 and pinion 17, and a scale 20 is a commonly used device for obtaining a direct scale reading of a quantity which is available as an angular velocity proportional to said quantity and forms no part of this invention. The directions of rotation of shafts 13 and 14 of differential 15 are chosen so that the output of differential 15, shaft 16, rotates pinion 17 which positions rack 18 and the ball carriage of integrator 19. Motion of rack 18 also positions a pointer which indicates a reading on scale 20. The disk of integrator 19 is rotated at a constant angular velocity. The output roller of integrator 19 drives input shaft 14 of differential 15.

When the rate of rotation of shaft 13 changes, differential 15 will have an output which re-positions the ball carriage of integrator 19 through the rack 18 and pinion 17. This changes the rate of rotation of the output roller of integrator 19, which in turn is connected to input shaft 14 of differential 15 until the differential has no further output. Thus, the position of the ball carriage provides an indication of the rate of rotation of shaft 13.

It has been demonstrated that variations in supply frequency do not affect the computed ratio of ground speed to height above ground, since supply frequency and photocell output frequency are affected in the same proportion.

I claim:

1. Apparatus for determining the relationship between the ground speed of an airborne vehicle and its height above ground, in combination, optical means for projecting an image of ground terrain, a photosensitive element interposed in the projection of said image of ground terrain said photosensitive element having an electrical output substantially proportional to the intensity of the light impinged upon it, a rotating grid interposed in the projection of said image of ground terrain to produce optical variations of said image of ground terrain appearing at said photosensitive element, first means for converting the output of said photosensitive element into first particular values, second means for converting the rotational velocity of said rotating grid into second particular values, said first and said second particular values being rotational velocities of mechanical elements suitably arranged to permit the extraction of their differences, and differential means coupled to said first and said second means for extracting the difference between said first and said second particular values to produce a quantity corresponding to the ratio of velocity to height.

2. Apparatus for determining the ratio of aircraft ground speed to height above ground comprising, a rotating grid, means to drive said grid at a constant rotational velocity, a photosensitive element having electrical output means said element positioned adjacent to said rotating grid, optical means adapted to project an image of ground terrain through said grid onto said photosensitive element, electromechanical means adapted to convert electrical output variations of said photosensitive element into a first shaft rotation with rotational velocity proportional to the electrical output variations of said photosensitive element, electromechanical means adapted to provide a second shaft rotation with rotational velocity proportional to said constant rotational velocity of said grid, and a mechanical differential connected to said first and second shaft adapted to extract the difference between said first and second shaft rotations whereby said difference is proportional to the desired ratio of ground speed to height.

References Cited in the file of this patent

UNITED STATES PATENTS

| | | |
|---|---|---|
| 2,292,153 | Olson | Aug. 4, 1942 |
| 2,439,295 | Hammond et al. | Apr. 6, 1948 |
| 2,866,373 | Doyle et al. | Dec. 30, 1958 |